United States Patent [19]

Maram et al.

[11] Patent Number: 4,772,789
[45] Date of Patent: Sep. 20, 1988

[54] LEAK IMAGING USING DIFFERENTIAL ABSORPTION

[75] Inventors: Jonathan M. Maram, Chatsworth; Ray C. Delcher, Canoga Park, both of Calif.

[73] Assignee: Rockwell International Corporation, El Segundo, Calif.

[21] Appl. No.: 138,532

[22] Filed: Dec. 28, 1987

[51] Int. Cl.$^4$ .................. G01N 21/47; G01N 21/35
[52] U.S. Cl. .................................. 250/330; 250/339
[58] Field of Search ............... 356/432, 434, 437, 438, 356/440; 250/330, 341, 358.1, 339; 73/592, 40, 405 R

[56] References Cited

U.S. PATENT DOCUMENTS

| | | | |
|---|---|---|---|
| 3,700,890 | 10/1972 | Kruezer | 250/341 |
| 3,998,557 | 12/1976 | Javan | 356/434 |
| 4,264,209 | 4/1981 | Brewster | 356/437 |
| 4,555,627 | 11/1985 | McRae, Jr. | 250/330 |
| 4,612,797 | 9/1986 | Barkhoudarian | 73/40.5 |

OTHER PUBLICATIONS

J. D. Trolinger, "Application of Generalized Phase Control During Reconstruction to Flow Visualization Holography", Applied Optics, vol. 18, No. 6, Mar. 15, 1979, pp. 766–774.

F. J. Weinberg, "Optics of Flames", Washington Butterworths 1963, pp. 116–143.

M. S. Shumate et al, "Remote Measurement of Trace Gases With the JPL Laser Absorption Spectrometer", Optical and Laser Remote Sensing, Springer-Verlag Berlin Heidelberg, New York 1983, pp. 31–37.

Primary Examiner—Stewart J. Levy
Assistant Examiner—Louis M. Arana
Attorney, Agent, or Firm—H. Fredrick Hamann; Harry B. Field; Lawrence N. Ginsberg

[57] ABSTRACT

A method for detecting, locating and measuring leaks in a test object is described using a differential absorption technique. In a preferred embodiment the test object is first pressurized with a light absorbing fluid. The test object is then illuminated with a light source at a wavelength which is capable of being absorbed by the absorbing fluid. An image of the test object and any fluid in the vicinity of the test object is created by means of a video camera directed toward the test object and that image is electronically stored. A second image is then created in such a manner that any absorbing fluid in the vicinity of the test object does not appear in that second image. The second image is also electronically stored. The electronically stored information regarding the first and second images are then compared and analyzed for detecting, locating and measuring any leaking fluid from the test object.

26 Claims, 6 Drawing Sheets

GEOMETRIC MODEL USED FOR OPTICAL
LEAK DETECTION ANALYSIS

LEAK IMAGING USING DIFFERENTIAL ABSORPTION

STATEMENT OF GOVERNMENT INTEREST

The Government has rights in this invention pursuant to Contract No. F04611-85-C-0076 awarded by the U.S. Department of Air Force.

BACKGROUND OF THE INVENTION

1. Field of the Invention

The present invention relates to methods for detecting, locating and measuring leaks in test objects, and more specifically, to a system using a differential absorption technique for detecting, locating and measuring leaks.

2. Description of the Prior Art

There is clearly a need for a more rapid, thorough and reliable leak detection approach for sealed systems, in general, and reusable rocket engines, in particular. The current approach used on the Space Shuttle Main Engine (SSME) involves a soap solution and is quite laborious, as well as incomplete, because only preselected points on the engine are inspected. An extension of this approach to all the hundreds of joints, welds, and brazes on the engine would be prohibitively time-consuming and is not practical. An alternative approach has been utilized which consists of surrounding the entire engine with an airtight bag and testing for helium leaks with a mass spectrometer. While more accurate and reliable for detecting the presence of leaks, this method is again quite laborious and, furthermore, gives no indication whatsoever of where the leaks are occurring. If leaks are detected, bagging must still be followed by time-consuming soap solution testing to identify the leak sources. The entire leak inspection process on the SSME consumes several workshifts and often must be repeated one or more times to reliably identify leaks and determine their sources. In contrast, turnaround times desired for future reusable space vehicles are on the order of one day or less, implying that total vehicle inspection times must be on the order of hours or less.

The application of optical imaging for visualizing leaks has been demonstrated by the present assignee, Rockwell International Corporation, using a holographic technique. U.S. Pat. No. 4,612,797 issued to Sarkis Barkhoudarian entitled, "Leak Locating and Mapping System and Method". In this technique, holographic records are made of a system under test before and after pressurization with a gas, and the records are superimposed, revealing interference fringe distortions where leaking gas appears.

Other optical techniques studied and tested by Rockwell International Corporation for the SSME program have included schlieren and speckle interferometry. In each technique, the engine under inspection is pressurized with an inert gas which then escapes from locations such as faulty joints or welds. Each technique is configured to provide an image of an engine section, captured by a video camera, in which the leaks appear as visible, localized disturbances. The techniques are based on different physical principles: In the case of schlieren, the disturbances are induced by the bending of collimated light by leaking gas; in the case of speckle interferometry, the disturbances are induced by minute shifts in the optical path length of laser light due to the leaking gas.

Each of the above techniques are very sensitive to vibration, air currents and small changes in optical alignment. Furthermore, they are limited in their sensitivity to small leaks and generally require complex imaging processes.

OBJECTS OF THE INVENTION

Accordingly, it is an object of the present invention to provide a leak locator system which is capable of detecting the location and magnitude of any and all leakage flows emanating from a test subject.

Another object of the present invention is to provide an automatable leak locator system for rocket engines and other test subjects which is both expedient and effective over the substantial entirety of a test subject.

It is yet another object of the present invention to provide a method of locating and measuring leaks which neither requires the attachment of devices to the test subject nor requires the application of film or foreign fluid to any surface of the subject.

It is another object of the present invention to provide a method for locating and measuring leaks which can be executed remotely from the test subject, thus allowing the placement of the leak locator in a protected or otherwise benign environment.

It is still another object of the present invention to provide a method and device capable of mapping the spatial extent of leakage flows from a test subject.

It is still another object of the present invention to provide a means for locating the smaller leaks in rocket engines, particularly those which are not ordinarily detectable using holographic interferometry or other optical techniques.

It is yet another object of the present invention to provide a method and device for detecting leaks which is virtually immune to vibration, shock, air currents and other atmospheric effects which would degrade the performance of other optical inspection techniques.

Other objects, advantages and novel features of the present invention will become apparent from the following detailed description of the invention when considered in conjunction with the accompanying drawing.

SUMMARY OF THE INVENTION

In its broadest aspects, the present invention involves the utilization of differential absorption techniques for detecting, locating and measuring leaks from a test object. In a preferred method the test object is first pressurized with a light absorbing fluid and the exterior of the test object is illuminated with a light source at a wavelength which is capable of being absorbed by the absorbing fluid. A video camera is then used to image the test object and the image is electronically stored. The test object is then illuminated with a light source at a wavelength which is not capable of being absorbed by the absorbing fluid. The resulting second image is also electronically stored. These stored images are then electronically compared and analyzed for detecting, locating and measuring any leaking fluid from the test object.

The step of electronically comparing and analyzing the electronically stored information is preferably accomplished by first calculating the amount of absorbing fluid observed at each picture element of the camera by comparing the first image with the second image. A new image is then electronically generated in which the intensity at each picture element is proportional to the amount of absorbing fluid observed at the corresponding picture element in the first image. The new image is then electronically processed to determine local regions of fluid concentration. Preferably, the test object is pressurized with sulfur hexafluoride and is illuminated by two $CO_2$ lasers tuned at different wavelengths.

In another embodiment the test object is illuminated with a broad-band light source and is imaged with a camera which is only sensitive to light at a wavelength which is capable of being absorbed by the absorbing fluid. The second image is created by use of a camera which is only sensitive to light at a wavelength which is not capable of being absorbed by the absorbing fluid, for example by use of a narrow-band optical filter in front of the camera.

BRIEF DESCRIPTION OF THE DRAWINGS

In FIG. 7 the vicinity near the test object is shown illuminated with a light source at a wavelength which is capable of being absorbed by the absorbing fluid.

In FIG. 8 the vicinity near the test object is shown illuminated by a light source at a wavelength which is not capable of being absorbed by the absorbing fluid.

In FIG. 9 the image presented is that created by subtracting, at each picture element, the logarithm of the intensity of the image of FIG. 7 from the logarithm of the intensity of the image in FIG. 8.

FIG. 10 illustrates a computerized determination of local regions of fluid concentration and corresponding leak rates.

FIG. 11 demonstrates a further computer analysis which associates the local regions of fluid concentration to specific flanges.

The same elements or parts throughout the figure of the drawings are designated by the same reference characters, while equivalent elements bear a prime designation.

DETAILED DESCRIPTION OF THE INVENTION

1. Preferred Embodiments

Figure 1:
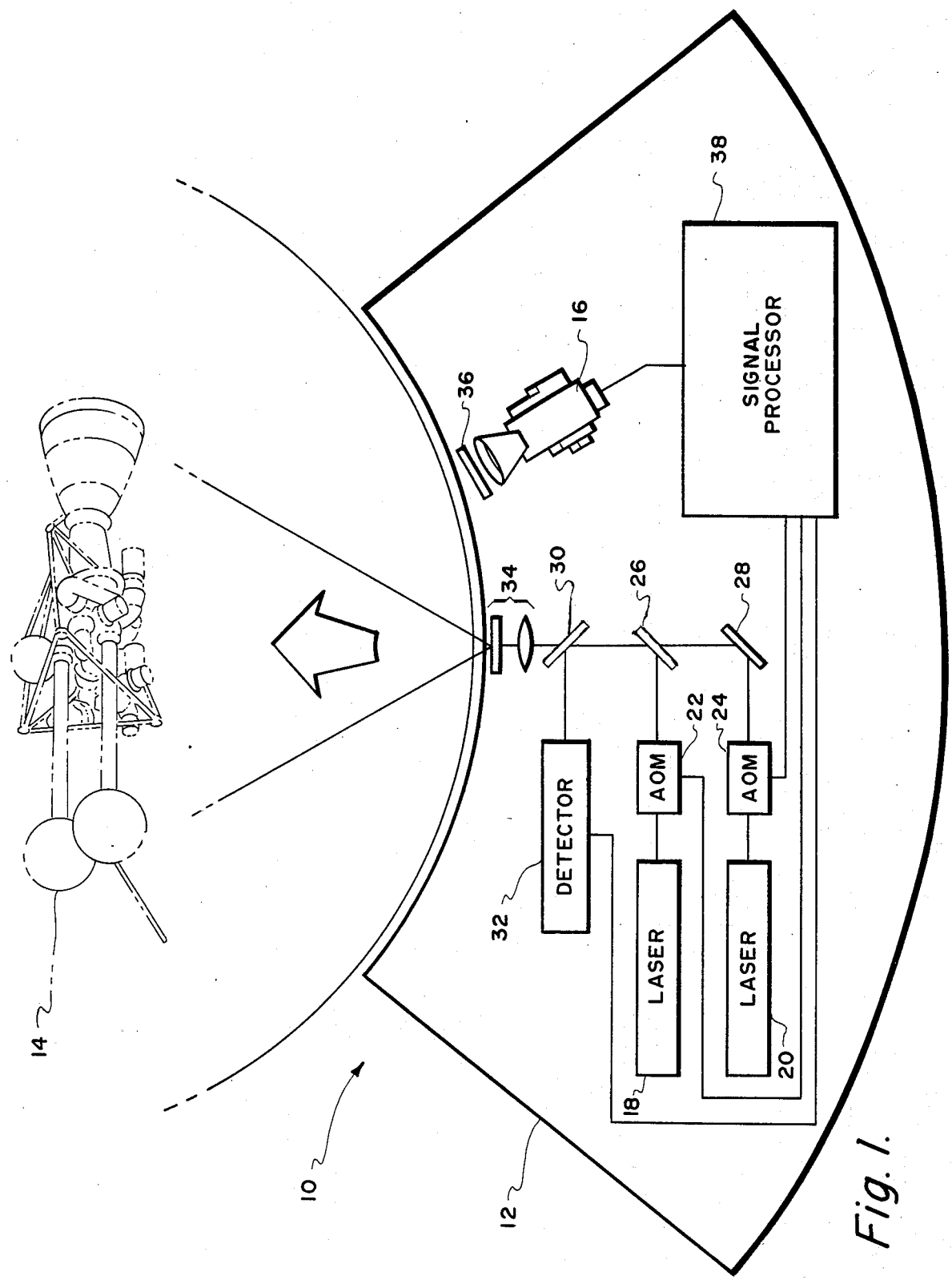
FIG. 1 is a schematic view of a leak detection system constructed and operated according to a preferred embodiment of the claimed invention, utilizing two laser sources.

Referring to the drawings and to the characters of reference marked thereon, FIG. 1 illustrates a preferred embodiment of the invention, designated generally as 10 supported on a platform 12. A rocket engine 14 or other test object is pressurized with the gas which absorbs light strongly in the infrared part of the spectrum. (The rocket engine 14 is shown in phantom emphasizing that it may be much larger than the apparatus 10.) A preferred pressurant gas is sulfur hexafluoride. The engine 14 is monitored with an infrared camera 16, which provides a two-dimensional image of the engine 14. Light beams from lasers 18,20 are directed through acoustic-optic modulators 22,24. Using a beamsplitter 26 and a mirror 28 the light beams are steered into a single path. A small fraction of the laser light along this path is redirected by a beamsplitter 30 and measured with a photodetector 32 to determine and compensate for variations in incident laser intensity at each wavelength. The majority of the laser light passes through a spatial filter 34 which expands the light to completely illuminate all points on the rocket engine 14 within the line of sight of the camera 16. The laser sources 18,20 may be, for example, $CO_2$ lasers. The acoustic-optic modulators 22,24 allow the engine 14 to be illuminated in an alternating fashion. Each laser source 18,20 is at a different wavelength. Thus, the engine is illuminated with one laser at a wavelength strongly absorbed by the tracer gas; then, with the other laser, at an infrared wavelength at which the tracer gas is transparent. An optical bandpass filter 36 is located in front of the camera 16 to reject thermal background and other interference effects while still accepting light from both laser wavelengths. The infrared images formed at the two wavelengths are compared by an electronic signal processor 38 which detects the location and magnitude of the leak by measuring a localized difference in the relative intensities of the two wavelengths. This difference is due to the leaking gas absorbing infrared energy at one wavelength, but not the other. Differential absorption is very sensitive (down to parts per million) and is capable of providing accurate quantification of gas concentrations. It is also very insensitive to vibration, simplifying its mechanical design.

Figure 2:
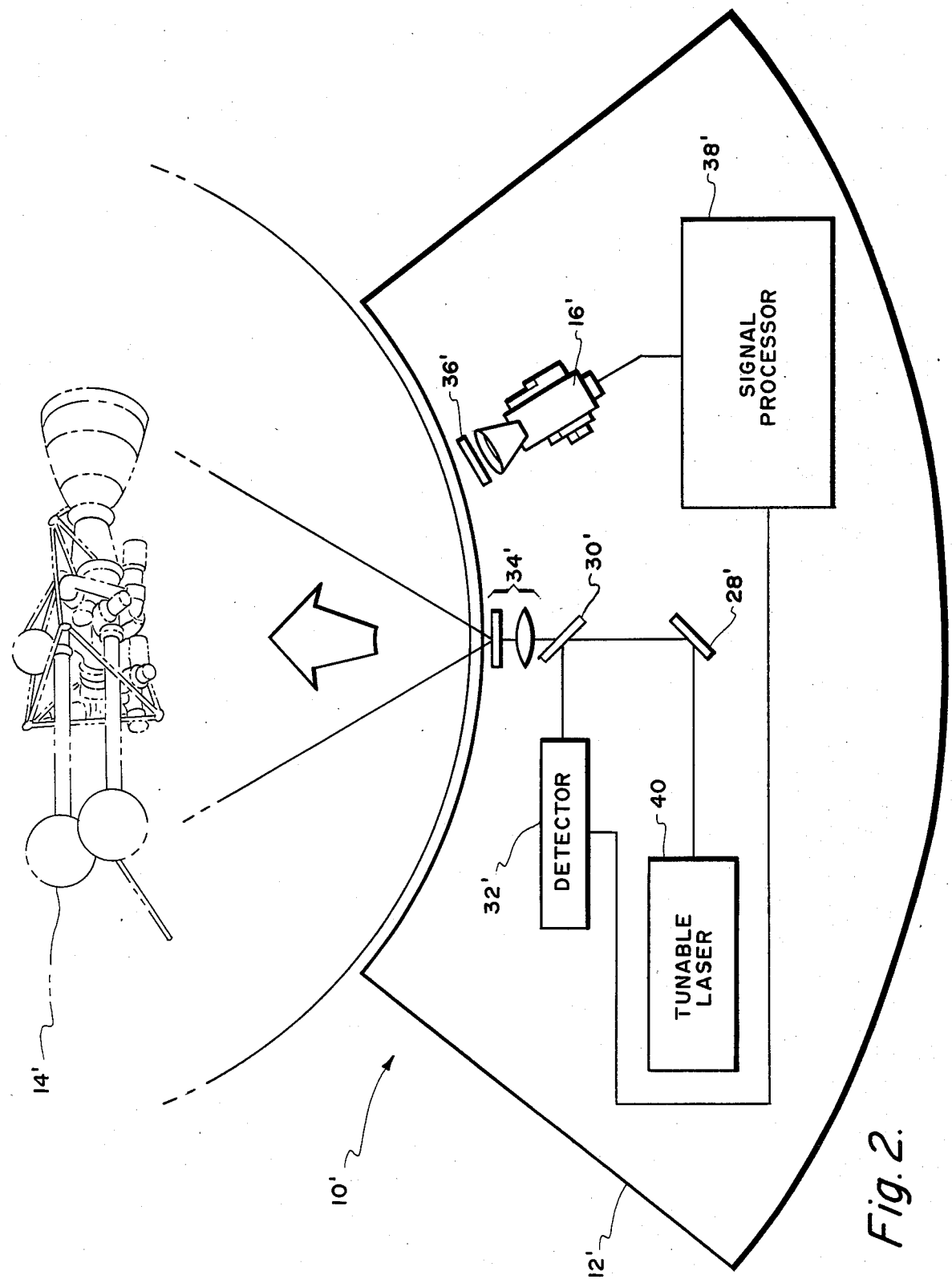
FIG. 2 is a schematic view of a leak detection system constructed according to another embodiment of the present invention, utilizing a single tunable laser.

Referring now to FIG. 2, a second embodiment of the present invention is shown which uses a single, tunable $CO_2$ laser 40. In this case, both absorbed and unabsorbed wavelengths are generated by the single laser, considerably simplifying the design. However, making the transition between wavelengths is much less rapid than in the previous embodiment.

It is noted that rather than using a tunable laser, a fixed wavelength laser may be used which generates light at a wavelength which is absorbed by the absorbing fluid. In this case, one image is recorded without any absorbing gas surrounding the test object and another is recorded with absorbing gas present due to leaks in the vicinity of the test object.

Figure 3:
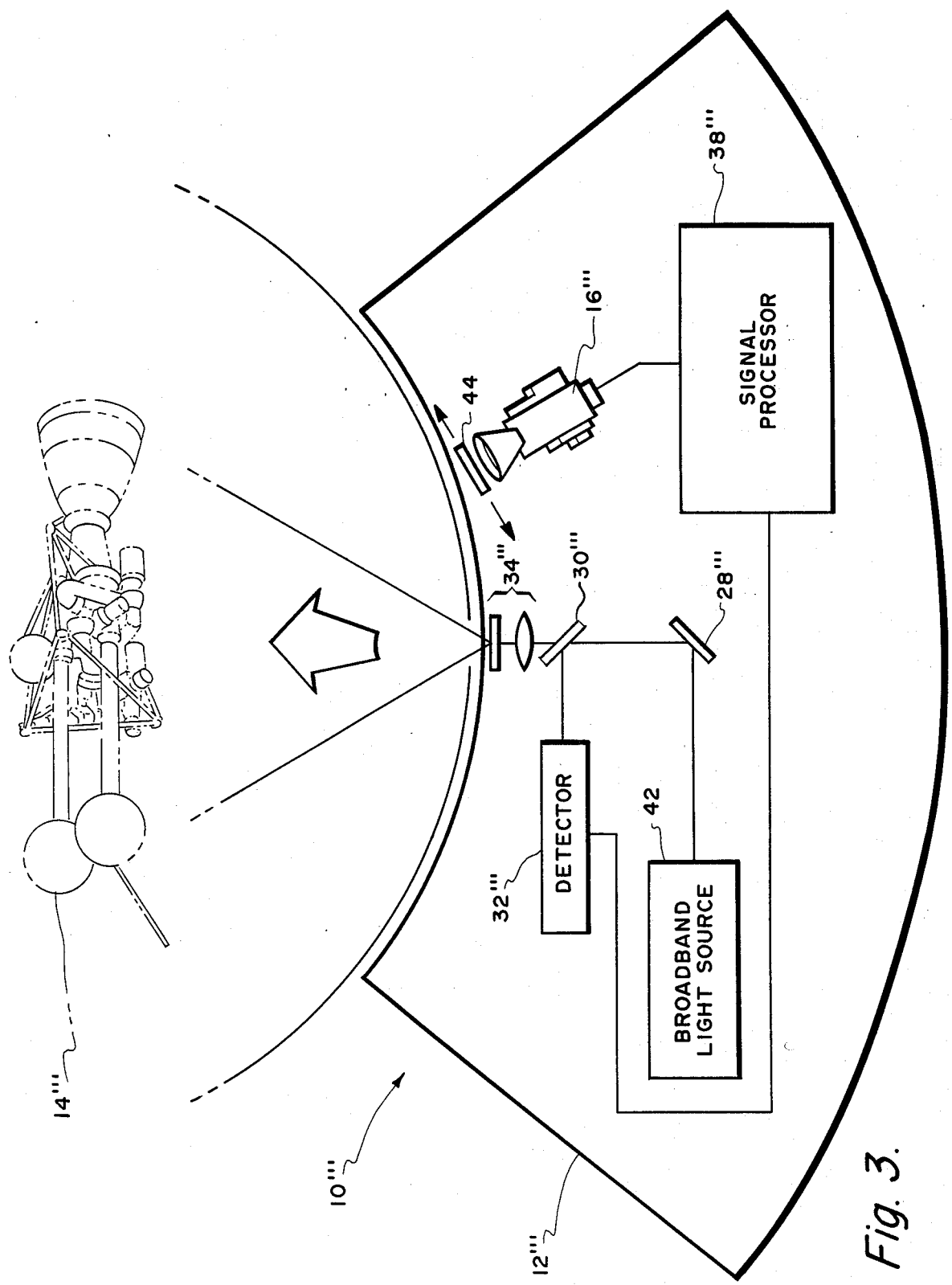
FIG. 3 is a schematic view of another preferred embodiment of the present invention, utilizing a broad-band light source.

In FIG. 3 the tunable laser of the FIG. 2 embodiment is substituted for a broad-band light source 42. In this instance the test object 14''' is imaged with a camera 16''' which is only sensitive to light at a wavelength which is capable of being absorbed by the absorbing fluid. This can be accomplished, for example, by placing a narrow-wavelength bandpass filter 44 in front of the camera 16''', which passes only light at that wavelength. After the image is electronically stored the test object 14''' is imaged with the camera 16''' which is only sensitive to light at a wavelength which is not capable of being absorbed by the absorbing fluid. This can be accomplished by replacing the first narrow-wavelength bandpass filter 44 by a second one which passes only light at a wavelength which is not absorbed by the absorbing fluid. This embodiment may be useful when operating in wavelength ranges which cannot be accessed by commercially available lasers, e.g. the far ultraviolet.

2. Theoretical Considerations

Differential absorption techniques have been used for air pollution and toxic gas monitoring. For example, the paper entitled, "Remote Measurement of Trace Gases With the JPL Laser Absorption Spectrometer" by M. S. Shumate, W. B. Grant, and R. T. Menzies, *Optical and Laser Remote Sensing*, Springer-Verlag, 1983. Vol. 39, pgs. 31–37 describes the measurement of anthropogenic trace gases in the troposphere. In the method described in that paper a single detection element is used to measure the magnitude of absorption of a laser beam by the trace gases.

The basis for calculating the trace gas concentrations resides in a one-dimensional treatment of the Beer-Lambert Law which is a well-known formula for calculating the absorption of light by a gas. In particular, the intensity I of a narrow, collimated beam of light after passing through a uniformly distributed, finite volume of gas is given by $$I = I_0 \exp(-afl) \quad (1)$$

where a is the absorption coefficient of the gas at the wavelength of the light beam, f is its concentration, l is the distance traveled by the light beam through the gas, and $I_o$ is the intensity of the beam if the gas were absent. For non-uniform gas distributions, a more general formula should be used $$I = I_0 \exp(-a \int f(l) dl) \quad (2)$$

where $\int f(l)dl$ is the integral of the gas concentration over the path the laser beam travels.

Figure 4:
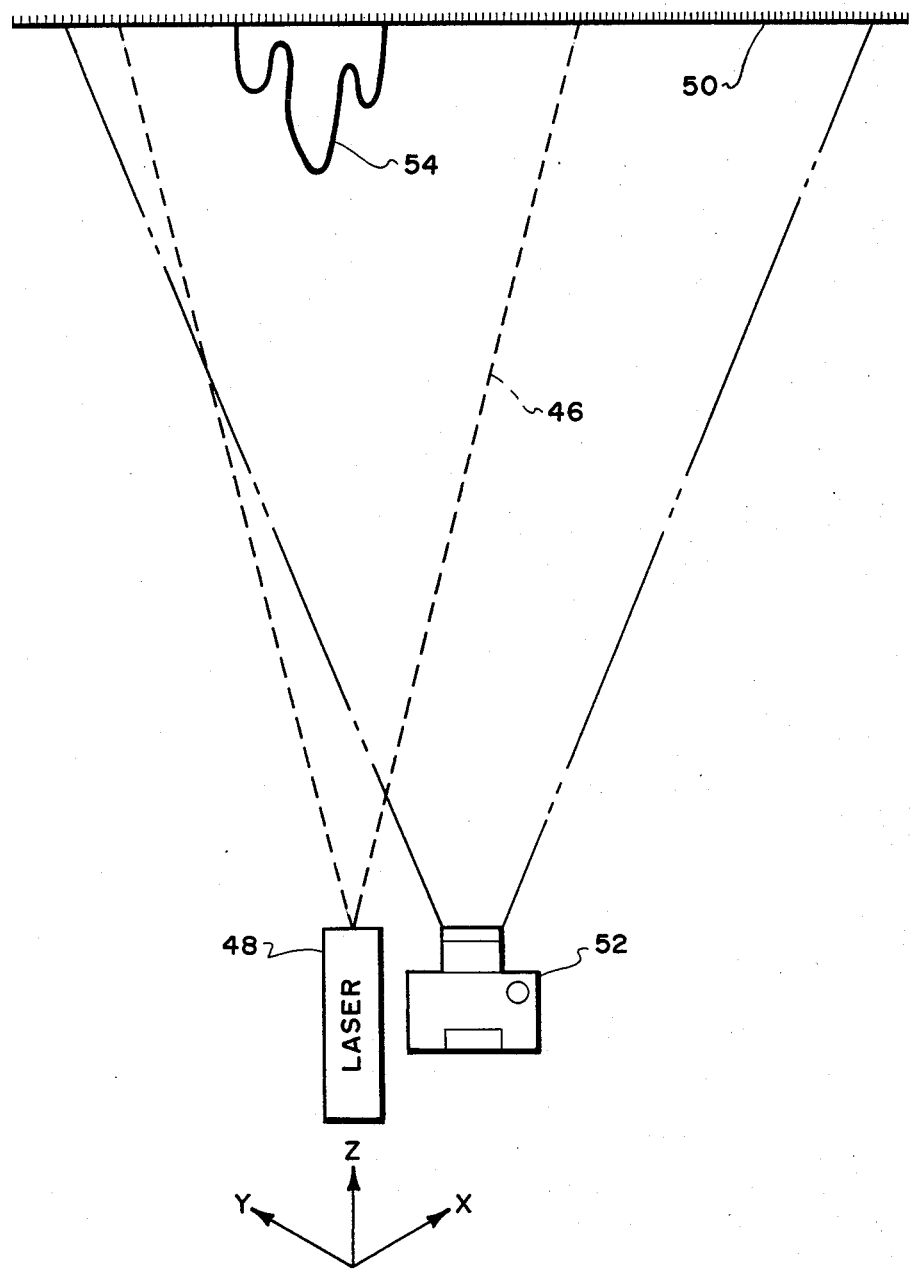
FIG. 4 is an illustration of a simplified geometrical model used for mathematical characterization of differential absorption based leak imaging.

Inasmuch as the present inventors' application of differential absorption requires detection of the leak without foreknowledge of its location, a three-dimensional application of the Beer-Lambert Law is required. FIG. 4 shows a simplified model of an optical leak inspection system. Here, an expanded laser beam 46 from a laser source 48 is reflected off a surface 50 (i.e. the engine surface) and the reflected beam is monitored by a camera 52 and associated photodetector array situated next to the laser source 48. A finite volume of gas 54 appearing near the reflecting surface 50 absorbs the light reaching each point on the detector given by I(x,y) with the absorbing gas present, and $I_o(x,y)$ in the absence of the gas, then I(x,y) is given by $$I(x,y) = I_0(x,y) \exp(-a \int f(x,y,z) dz) \quad (3)$$

Here, the integral along the path l at a given point (x,y,z) is approximated by an integral parallel to a z-axis which is coincident with the laser axis.

Solving for the integrated concentration of gas, we have $$\int f(x,y,z) dz = \frac{1}{a} [\ln(I_0(x,y)) - \ln I(x,y))] \quad (4)$$

The total quantity of gas in moles, N, is given by $$N = \tfrac{1}{2} \int \int \int f(x,y,z) dx dy dz \quad (5)$$
$$= \frac{1}{2a} [\int \int \ln I_0(x,y) dx dy - \int \int \ln(I(x,y)) dx dy]$$

Here, it is assumed that the order of integration is arbitrary, so that the triple integral corresponds to a volumetric integral. The factor ½ appears to account for the passage of the light twice though the gas before reaching the detector array.

This N may be approximated by $$N = \frac{1}{2a} \sum_{xy} [\ln I_{oxy} - \ln I_{xy}] \quad (6)$$

where $$\sum_{xy}$$

denotes a summation over all the elements in the photo detector array, $I_{xy}$ is the intensity of light reaching the element (x,y) on the array with the absorbing gas present, and $I_{oxy}$ is the intensity of light in the absence of absorbing gas.

Assuming that all the gas is contained within the laser beam path, the measured leak rate in moles per second is given by $$\frac{N}{T} = (\tfrac{1}{2}aT) \sum_{xy} [\ln I_{oxy} - \ln I_{xy}] \quad (7)$$
$$= R/a$$

where T is the time required for the quantity of gas N to enter the laser beam, and where the factor R is parameter which can be directly calculated by digital analysis of the image received by the photodetector array.

Thus, the leak rate can be determined by measurement of the intensities $I_{oxy}$ and $I_{xy}$, the intensities at (x,y) before and after the gas is introduced. Alternatively, $I_{oxy}$ can be estimated after the gas is introduced by using laser light which is at a wavelength that is unabsorbed by the gas, assuming that the spatial distribution of light emerging from the laser source can be kept independent of wavelength (approximately true in practice). The entire leak measurement can then be made after the gas is introduced.

3. Preferred Infrared Absorbing Gases

A review has been performed by the present inventors to identify suitable gases for the leak detection technique presently described. The following gas properties were sought in this review:

(1) Strong absorption of light, at a wavelength accessible by a commercially available monochromatic source, which is not absorbed by natural constituents of air
(2) Low order of toxicity
(3) Inertness to rocket engine internal component materials
(4) Absence of the gas from the normal constituents of the atmosphere Properties (1) and (4) were sought so that the leaking gas could be readily detected and distinguished from gas constituents in the air. Properties (2) and (3) were sought to assure the safety of maintenance personnel and of the engine itself. Based on a review of the physical properties of commercially available gases and the absorption spectra of gases, sulfur hexafluoride (SF$_6$) and fluorinated hydrocarbon gases sold under the trademark "FREON" including "FREON" 11, 12 and 13, were found to be promising with respect to properties discussed above. Each of these gases are considered to be of low order in toxicity, and virtually inert at ambient conditions.

Furthermore, each gas has a strong absorption coefficient at a wavelength accessible to a CO$_2$ laser: 15.9 atm$^{-1}$ cm$^{-1}$ for "FREON" 11 at 9.329 microns, 47.6 atm$^{-1}$ cm$^1$ for "FREON" 12 at 10.764 microns, 106 atm$^{-1}$ cm$^{-1}$ for "FREON" 13 at 9.026 microns, and 849 atm$^{-1}$ cm$^{-1}$ for SF$_6$ at 10.55 microns.

Among these gases, sulfur hexafluoride was found to be most suitable. It is much more strongly absorbing than the other gases, allowing detection of very low gas concentrations from small leaks. Sulfur hexafluoride has been used for optical flow diagnostics and in field applications of non-optical leak testing. Further, SF$_6$ is physiologically inert. The "FREON" gases may be entirely adequate for optical leak detection, however. Leaks of "FREON" 12 have been visualized down to 0.07 cm$^3$/sec.

Figure 5:
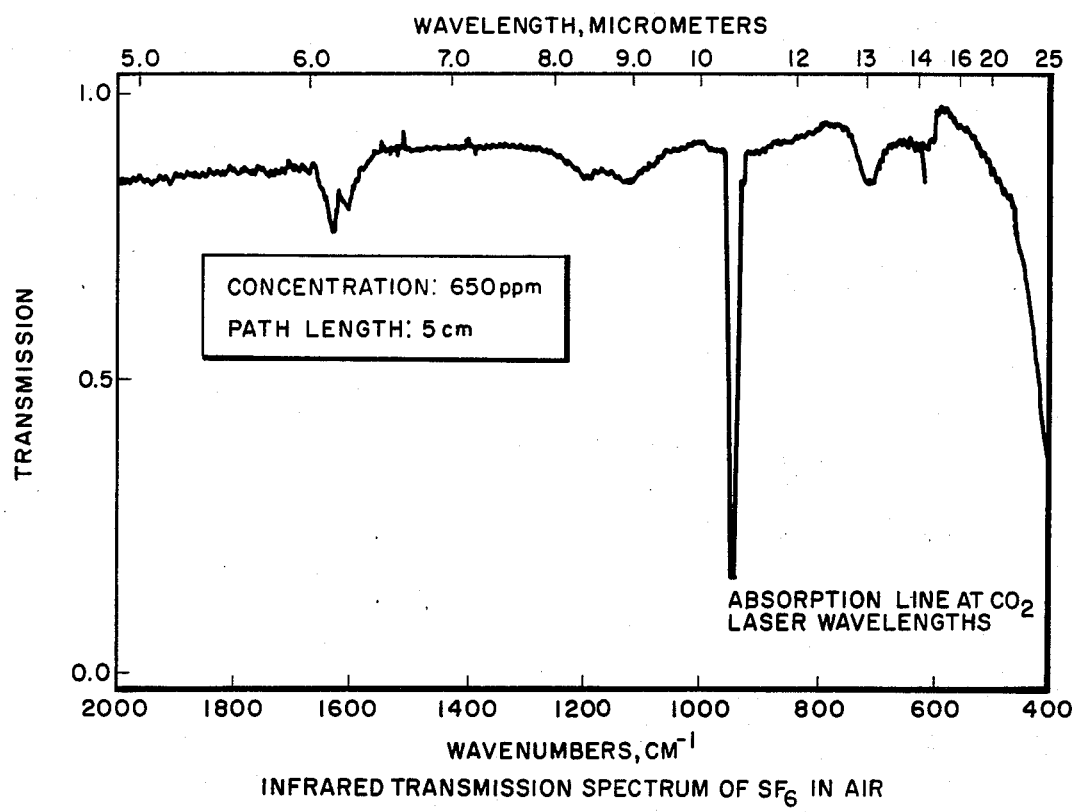
FIG. 5 is a graph illustrating the infrared transmission spectrum of sulfur hexafluoride in air.

Experiments have been performed with a tunable grating spectrometer to verify theoretical estimate of the absorption of light at CO$_2$ laser wavelengths (in the region of 10 to 11 microns) by trace concentrations of sulfur hexafluoride. FIG. 5 shows an absorption spectrum generated by a 5-cm cell at atmospheric pressure containing 650 parts per million of sulfur hexafluoride. At 10.55 microns (the P16 line of CO$_2$ lasers) 75% of the light was absorbed, based on the equation a=1/fd ln (I/Io), where f is the concentration of SF$_6$, a is the absorption coefficient, d is the path length through the cell and I/Io is the fraction of light transmitted through the cell. This corresponds to an absorption coefficient of 427 cm$^{-1}$. Assuming a camera accuracy of 0.2%, concentrations of less than 1 part per million could be detected with this technique, confirming earlier theoretical analyses.

The compatibility of SF$_6$ with various materials was also investigated by the present inventors. Sulfur hexafluoride is very stable and inert under ambient conditions. It decomposes at high temperatures (over 900° F.) or when exposed to an electrical arc or spark. It is used as a leak check medium, primarily in the natural gas industry, and also as an insulation material in transformers and cables. As a gas, it is five times as dense as air and does not readily react with metals or the standard non-metallic materials used on the SSME ("KEL-F", "TEFLON", ceramic oxides, "VITON", etc.).

4. Laboratory Evaluations

Equation 7 may be implemented on an image processor. A logarithmic algorithm was devised by the present inventors to calculate the expression on the right-hand side of this equation. This was performed on a vision processor by apportioning part of the processor's memory as a look-up table. The log values for each pixel ratio were manually entered into the table, allowing determination of a log by simple reference. A look-up table, when used with an appropriate machine allows the implementation of the logarithmic differential absorption algorithm in a fraction of a second. This, in turn, supports real-time leak quantification and location.

Results of a differential absorption quantification repeatability test of the logarithmic algorithm appear in Table 1 below.

TABLE 1

| Results of Quantification Repeatability Test | |
|---|---|
| TEST # | INTEGRATED INTENSITY |
| 1 | 1707 |
| 2 | 1672 |
| 3 | 1356 |
| 4 | 1739 |
| 5 | 1730 |
| 6 | 2076 |
| 7 | 1916 |

Leak Rate is 0.16 SCIM (.044 CM$^3$/sec)
Mean Integrated Intensity = 1742
Standard Deviation = 12%
Maximum Value is 19% above Mean
Minimum Value is 22% below Mean Each test was performed with the same geometry and was subject to normal air currents from the room's ventilation system. In each case a cloud of SF$_6$ emanating from a 0.044 cm$^3$/sec (0.16 scim) leak was analyzed by the new algorithm to yield an integrated intensity (the parameter R in Equation 7). The values of the integrated intensities had a standard deviation of 12% about their mean value.

The Autovision II vision processing machine used for this test was capable of distinguishing intensity values from the infrared camera from black to white in 16 values of brightness or greylevels. This fact serves to limit leak quantification accuracy to some extent, but becomes a greater problem when quantification is attempted over a wide range of leakage rates. The problem can be overcome by tuning the CO$_2$ laser to a wavelength that is more strongly or weakly absorbed by the trace gas, or by using a vision processor with a broader range of grey levels.

In addition to repeatability tests, a leak quantification test was performed. To accomplish this, the differential absorption leak quantification algorithm which was used with the Autovision II vision processor to produce the quantification table was rewritten for a Matrox IBM PC-based processor capable of distinguishing 256 greylevels. Leak rates from 1.36 scim (0.37 cm$^3$/sec) to 11.36 scim (3.10 cm$^3$/sec) were covered in the test of this new algorithm.

The quantification algorithm determined the leak rate by finding the logarithm of the pixel value of a no-leak image, subtracting the pixel value of a corresponding leak image, and summing the results for all pixels in the two images. The resultant value is the logarithmic integrated intensity and is proportional to the gas concentration within the field of view of the infrared camera.

Figure 6:
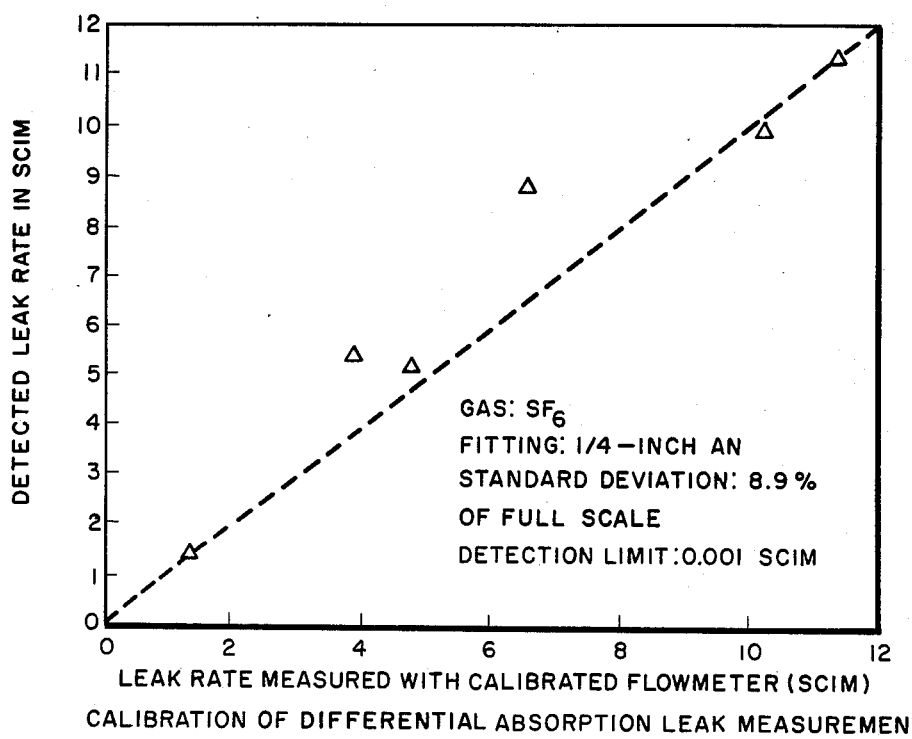
FIG. 6 is a graph illustrating the calibration of the differential absorption leak detection system.

FIG. 6 displays the results of this differential absorption quantification test. The leak rates, as measured by a calibrated flowmeter, are displayed on the X-axis of the graph. The Y-axis corresponds to the leak rate calculated from the optical system output. In order to prevent the cloud of leaking sulfur hexafluoride (SF$_6$) from appearing completely black to the infrared camera and vision processor, the illuminating CO$_2$ laser was tuned to the weakly absorbed P36 line. The P36 line of the CO$_2$ laser has a wavelength of about 10.77 microns. Using an expanded version of the wavelength versus transmission graph shown previously as FIG. 5, the absorption coefficient for 10.77 micron radiation in SF$_6$ was found to be roughly 10 atm$^{-1}$ cm$^{-1}$. The absorption coefficient can be raised as high as 849 atm$^{-1}$ cm$^{-1}$ at the P16 10.55 micron line of the CO$_2$ laser if low leak rates require the extra sensitivity.

Theoretically, if the leaking SF$_6$ moves out of the field of view of the IR camera at a relatively constant velocity independent of leak rate, then the amount of SF$_6$ in the field of view is linearly proportional to leak rate. The logarithmic integrated intensity algorithm is designed to yield an output value proportional to the amount of SF$_6$ in the camera's field of view. So, if the SF$_6$ moves out of the camera's field of view with a velocity only weakly dependent on leak rate, then the logarithmic integrated intensity value from the processor should still be nearly linearly proportional to the actual leak rate.

FIG. 6 tests this assumption and theory by using one test point to calibrate the other integrated intensity values to leak rate and plotting the theoretically calculated images leak rates versus the values measured by a calibrated flowmeter. The standard deviation of these points from theory is 8.9% of full scale, indicating that this simple theory provides a very good approximation.

In summary, tests of the logarithmic differential absorption method have produced results repeatable to approximately 10%. This compares very favorably to the soap solution method currently used on the SSME which is only capable of quantifying leaks to within an order of magnitude. This gain in accuracy provides added information valuable for diagnosing identified leaks.

5. Example of a Display Technique

Figure 7:
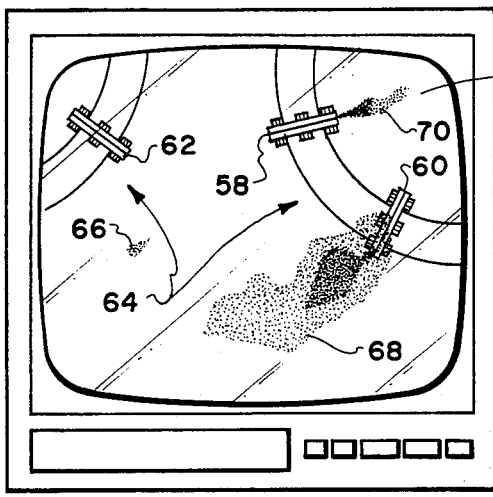
FIGS. 7-11 are a series of schematic drawings for sequentially illustrating the manner in which the claimed method of leak detection can be presented on a video monitor.

FIGS. 7-11 sequentially illustrate the manner in which the present inventive leak locating method may be presented on a video monitor designated 56. As a first step to this technique the video camera is directed, for example, toward three flanges 58,60,62 on the test object designated generally as 64. The test object 64 is pressurized with a light absorbing fluid and is illuminated with a light source at a wavelength which is capable of being absorbed by the absorbing fluid. The resulting image of the test object and its vicinty is displayed on the video monitor 56, as illustrated in FIG. 7. This image shows clouds 66,68,70 of absorbing fluid.

Figure 8:
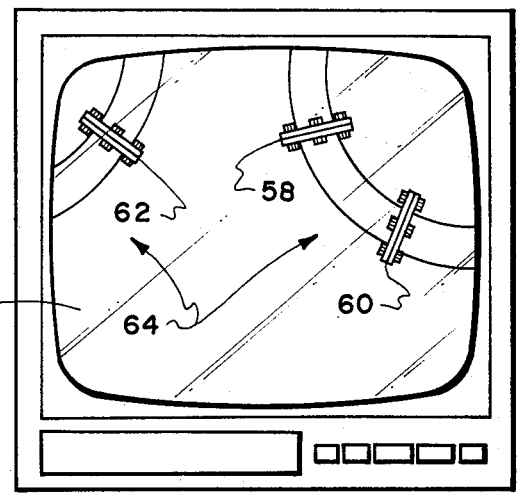

A second image of the test object and its vicinity is created in such a manner that any absorbing fluid in the vicinity of the test object 64 does not appear in that second image. This image is displayed on the video monitor 56, as illustrated in FIG. 8. As noted, this may be accomplished by illuminating the test object 64 with a light source at a wavelength which is not capable of being absorbed by the absorbing fluid or by simply removing the light absorbing fluid from the vicinity of the test object 64 by means of, for example, a blower.

Figure 9:
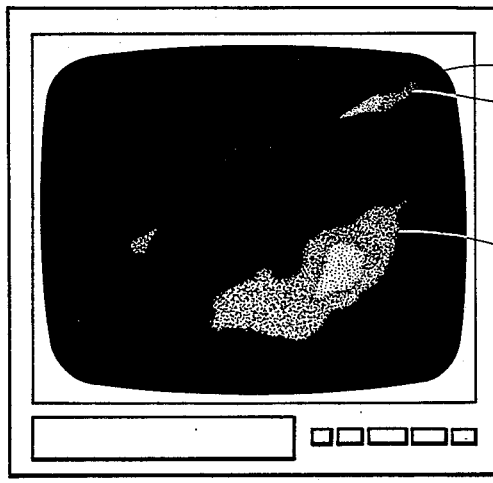

A quantitative distribution of leaking gas may then be displayed on the monitor 64 as shown in FIG. 9. This is accomplished by subtracting, at each picture element or pixel, the logarithm of the intensity of the image of FIG. 8 from the logarithm of the intensity of the image in FIG. 7. Thus the light regions 72,74 denote areas of probable leaks.

Figure 10:
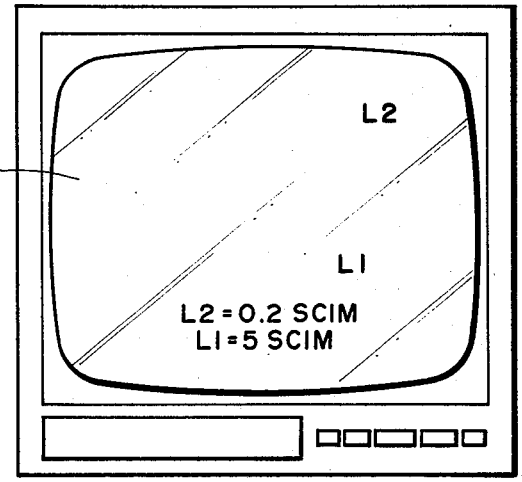
Figure 11:
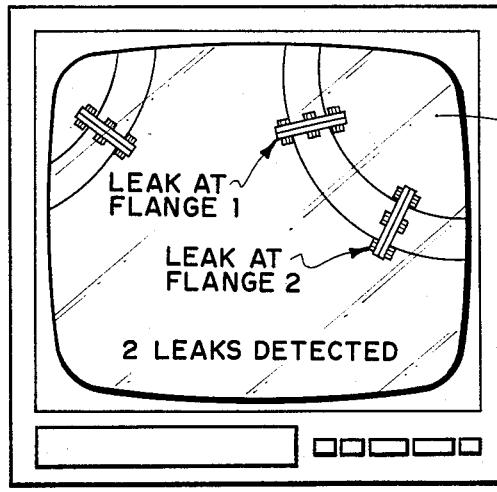

Next, as shown in FIG. 10, the computer analyzes the image displayed in FIG. 9 to determine the locations and extent of bright regions in the image which correspond with local regions of fluid concentration. These local regions are labeled L1 and L2 in FIG. 10. Furthermore, the intensities in each of these local regions are added together to allow the calculation of the total concentration of leaking gas in that region, and the determination of the leak rate from the region. These leak rates may also be displayed on the video screen 56 as shown in the Figure.

Based on archival information stored in the computer on the design of the test object, the computer can associate the located local regions with joints, flanges, etc. from where they most likely occur. This facilitates any repair operations. An appropriate display may be as that shown in FIG. 11.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for detecting, locating and measuring leaks from a test object, comprising the steps of:
    (a) pressurizing the test object with a light absorbing fluid;
    (b) illuminating the test object with a light source at a wavelength which is capable of being absorbed by said absorbing fluid;
    (c) creating a first image of the test object and any fluid in the vicinity of the test object by means of a video camera directed toward said test object;
    (d) electronically storing said first image created by said camera;
    (e) illuminating said test object with a light source at a wavelength which is not capable of being absorbed by said absorbing fluid;
    (f) creating a second image of the test object and its vicinity by means of a video camera directed toward said test object;
    (g) electronically storing said second image; and
    (h) electronically comparing and analyzing the electronically stored information regarding said first and second images for detecting, locating and measuring any leaking fluid from said test object.

2. The method of claim 1 wherein the step of electronically comparing and analyzing the electronically stored information includes the steps of:
    (a) calculating the amount of absorbing fluid observed at each picture element of the camera by comparing said first and said second images;
    (b) electronically generating a third image in which the intensity at each picture element is proportional to the amount of absorbing fluid observed at the corresponding picture element in the first image; and
    (c) locating any sources of leaks by electronically processing said third image to determine local regions of fluid concentration.

3. The method of claim 2 further including the step of summing the intensities of the picture elements in each local region of fluid concentration and measuring the variation of the resulting sum with time to determine the leak rate at that local region.

4. The method of claim 2 further including the step of electronically correlating said local regions of fluid concentration with components of the test object.

5. The method of claim 2 wherein the amount of fluid observed at a given picture element is determined by calculating the logarithm of the ratio between corresponding picture element intensities produced in said first and second images.

6. The method of claim 1 wherein the test object is illuminated by a laser light source.

7. The method of claim 1 wherein the test object is pressurized with sulfur hexafluoride.

8. The method of claim 7 wherein the test object is illuminated by a tunable $CO_2$ laser.

9. The method of claim 1 wherein the test object is pressurized with an infrared absorbing fluid.

10. The method of claim 6 including placing an optical bandpass filter in front of the camera to reject thermal background and other light interferences.

11. A method for detecting, locating and measuring leaks from a test object, comprising the steps of:
   (a) pressurizing the test object with a light absorbing fluid;
   (b) illuminating the test object with a broad-band light source;
   (c) creating a first image of the test object and any fluid in the vicinity of the test object by means of a video camera directed toward said test object which is only sensitive to light at a wavelength which is capable of being strongly absorbed by said absorbing fluid;
   (d) electronically storing the image from said camera;
   (e) creating a second image of said test object and any fluid in the vicinity of the test object by means of a camera which is only sensitive to light at a wavelength which is not capable of being strongly absorbed by said absorbing fluid;
   (f) electronically storing said second image; and
   (g) electronically comparing and analyzing the electronically stored information regarding said first and second images for detecting, locating and measuring any leaking fluid from said test object.

12. The method of claim 11 wherein the step of electronically comparing and analyzing the electronically stored information includes the steps of:
   (a) calculating the amount of absorbing fluid observed at each picture element of the camera by comparing said first and said second images;
   (b) electronically generating a third image in which the intensity at each picture element is proportional to the amount of absorbing fluid observed at the corresponding picture element in the first image; and
   (c) locating any sources of leaks by electronically processing said third image to determine local regions of fluid concentration.

13. The method of claim 12 further including the step of summing the intensities of the picture elements in each local region of fluid concentration and measuring the variation of the resulting sum with time to determine the leak rate at that local region.

14. The method of claim 12 further including the step of electronically correlating said local regions of fluid concentration with components of the test object.

15. The method of claim 12 wherein the amount of fluid observed at a given picture element is determined by calculating the logarithm of the ratio between corresponding picture element intensities produced in said first and second images.

16. The method of claim 11 wherein the test object is pressurized with sulfur hexafluoride.

17. A method for detecting, locating and measuring leaks from a test object, comprising the steps of:
   (a) pressurizing the test object with a light absorbing fluid;
   (b) illuminating the test object with a light source at a wavelength which is capable of being absorbed by said absorbing fluid;
   (c) creating a first image of the test object and any fluid in the vicinity of the test object by means of a video camera directed toward said test object;
   (d) electronically storing said first image created by said camera;
   (e) removing said light absorbing fluid from the vicinity of said test object;
   (f) creating a second image of the test object and its vicinity by means of a video camera directed toward said test object;
   (g) electronically storing said second image; and
   (h) electronically comparing and analyzing the electronically stored information regarding said first and second images for detecting, locating and measuring any leaking fluid from said test object.

18. The method of claim 17 wherein the step of electronically comparing and analyzing the electronically stored information includes the steps of:
   (a) calculating the amount of absorbing fluid observed at each picture element of the camera by comparing said first and said second images;
   (b) electronically generating a third image in which the intensity at each picture element is proportional to the amount of absorbing fluid observed at the corresponding picture element in the first image; and
   (c) locating any sources of leaks by electronically processing said third image to determine local regions of fluid concentration.

19. The method of claim 18 further including the step of summing the intensities of the picture elements in each local region of fluid concentration and measuring the variation of the resulting sum with time to determine the leak rate at that local region.

20. The method of claim 18 further including the step of electronically correlating said local regions of fluid concentration with components of the test object.

21. The method of claim 18 wherein the amount of fluid observed at a given picture element is determined by calculating the logarithm of the ratio between corresponding picture element intensities produced in said first and second images.

22. The method of claim 17 wherein the test object is illuminated by a laser light source.

23. The method of claim 17 wherein the test object is pressurized with sulfur hexafluoride.

24. The method of claim 23 wherein the test object is illuminated by a tunable $CO_2$ laser.

25. The method of claim 17 wherein the test object is pressurized with an infrared absorbing fluid.

26. The method of claim 22 including placing an optical bandpass filter in front of the camera to reject thermal background and other light interferences.

* * * * *